United States Patent
Johansson

(10) Patent No.: US 9,252,836 B2
(45) Date of Patent: Feb. 2, 2016

(54) METHOD, DEVICES AND CHIP BLOCK FOR DS-CDMA

(75) Inventor: Niklas Johansson, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/408,464

(22) PCT Filed: Jun. 29, 2012

(86) PCT No.: PCT/SE2012/050751
§ 371 (c)(1),
(2), (4) Date: Dec. 16, 2014

(87) PCT Pub. No.: WO2014/003622
PCT Pub. Date: Jan. 3, 2014

(65) Prior Publication Data
US 2015/0117496 A1    Apr. 30, 2015

(51) Int. Cl.
| | |
|---|---|
| *H04B 1/69* | (2011.01) |
| *H04B 1/707* | (2011.01) |
| *H04B 1/713* | (2011.01) |
| *H04B 1/7097* | (2011.01) |

(52) U.S. Cl.
CPC .. *H04B 1/7097* (2013.01); *H04B 2201/709709* (2013.01)

(58) Field of Classification Search
CPC ............... H04B 1/7097; H04B 2201/709709; H04B 2001/6904; H04B 1/707; H04B 2201/7097
USPC .......... 375/141, 146, 147, 140; 370/320, 342, 370/335, 441
See application file for complete search history.

(56) References Cited

U.S. PATENT DOCUMENTS

| | | |
|---|---|---|
| 2005/0122947 A1 | 6/2005 | Wang et al. |
| 2005/0276238 A1 | 12/2005 | Dabak et al. |

(Continued)

FOREIGN PATENT DOCUMENTS

| | | |
|---|---|---|
| WO | WO 2006/086437 | 8/2006 |
| WO | WO 2007 091157 | 8/2007 |

OTHER PUBLICATIONS

International Search Report for International application No. PCT/SE2012/050751, Jun. 26, 2013.

(Continued)

*Primary Examiner* — Phuong Phu
(74) *Attorney, Agent, or Firm* — Patent Portfolio Builders, PLLC

(57) ABSTRACT

The present invention relates to a method of producing a chip block for wireless transmission in a Direct Sequence Code Division Multiple Access (DS-CDMA) communication system. The method comprises spreading a symbol over at least one chip block (17). The method also comprises segmenting the chip block to form a first sub-block ($a_0$) of the chip block. The method also comprises segmenting the chip block to form a second sub-block ($a_{15}$) of the chip block. The method also comprises arranging a first sub-sequence (18) of chips furthest to a first end of the chip block in the first sub-block. The first sub-sequence is identical to a second sub-sequence (19) furthest to a second end of the chip block in the second sub-block. The method also comprises modifying at least one chip contained in the first sub-block and not being part of the first sub-sequence. The modifying is dependent on said first sub-sequence such that the symbol can be at least partially despread from the chip block.

12 Claims, 8 Drawing Sheets

(56) References Cited

U.S. PATENT DOCUMENTS

2007/0201408 A1    8/2007   Tiirola et al.
2010/0316091 A1*  12/2010   Bar-Ness et al. ............. 375/141
2011/0188462 A1    8/2011   Yoo et al.

OTHER PUBLICATIONS

PCT Written Opinion of the International Searching Authority for International application No. PCT/SE2012/050751, Jun. 25, 2013.

"Cyclic-Prefix CDMA: An Improved Transmission Method for Broadband DS-CDMA Cellular Systems" by Baum et al., 2002.

"Blind Frequency Domain Equalization for CP-CDMA Downlink" by Leon et al., 2005.

3GPP TSG-RAN WG1 #56; Athens, Greece; Title: T-CPICH sequences for IMB (R1-090569), Feb. 9-13, 2009.

3GPP TSG RAN WGI #55bis; Ljubljana, Slovenia; Title: TDM pilot sequences for MBSFN IMB (Tdoc R1-090422), Jan. 12-16, 2008.

* cited by examiner

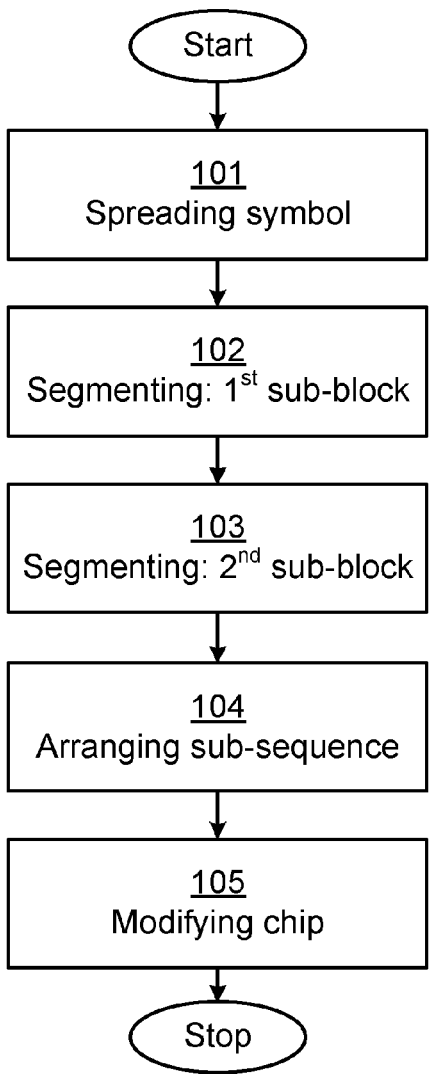
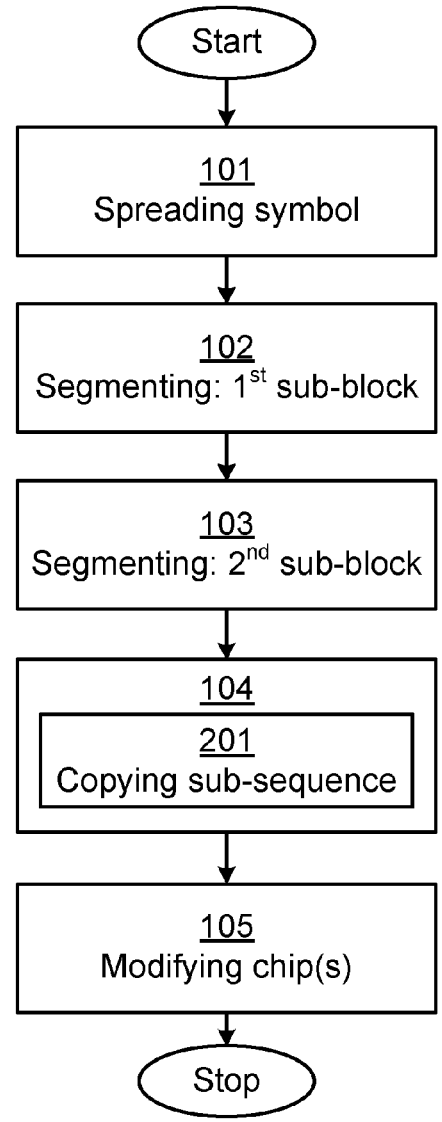
Fig. 4
Fig. 5
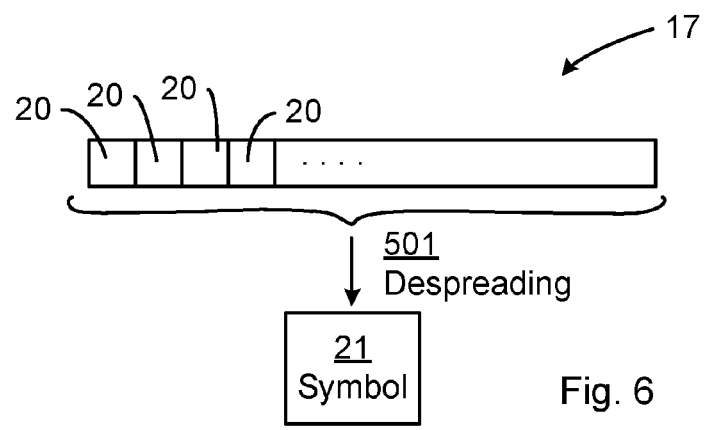
Fig. 6

METHOD, DEVICES AND CHIP BLOCK FOR DS-CDMA

PRIORITY

This nonprovisional application is a U.S. National Stage Filing under 35 U.S.C. §371 of International Patent Application Serial No. PCT/SE2012/050751, filed Jun. 29, 2012 and entitled "METHOD, DEVICES AND CHIP BLOCK FOR DS-CDMA."

TECHNICAL FIELD

The invention relates to methods and devices for producing a chip block for wireless transmission in a Direct Sequence Code Division Multiple Access, DS-CDMA, communication system.

BACKGROUND

In a DS-CDMA system data that is to be transmitted is first modulated into symbols. Then each symbol is spread using a spreading code where the spreading codes are orthogonal to each other. By this spreading several symbols can be transmitted simultaneously, and the sum of all spread symbols is a sequence of chips. If the spreading codes are orthogonal and if the radio channel is non-dispersive, there will be no interference between the symbols when the despreading is performed in the receiver. However, if the channel is dispersive, there will be interference between the symbols at the despreading even if the codes are orthogonal. This is because the codes are orthogonal only when they are time-aligned, and due to the time dispersiveness of the channel, several non-time-aligned copies of the transmitted signal arrive at the receiver at the same time.

A cyclic prefix is a number of samples or chips, in a DS-CDMA system, attached to the beginning of a block of a signal that is to be transmitted. The samples are copies of the last samples of the block.

By adding a cyclic prefix that is at least as long as the channel impulse response, the received signal appears to be a cyclic convolution of the original block, without inter-block interference. Cyclic convolution in time domain is equivalent to element-wise multiplication in frequency domain. Two advantages of having a cyclic prefix in the transmitted signal are:

In the received signal, the interference induced by a time-dispersive multi-path channel will only be intra-block interference, not inter-block interference.

A cyclic prefix facilitates frequency domain processing.

However, a cyclic prefix cannot be used for mobile communication standards already in use, such as Wideband Code Division Multiple Access (WCDMA)/High Speed Packet Access (HSPA), since terminals and base stations already in use (legacy devices) are not equipped to handle a cyclic prefix.

US2007201408 discloses selecting either a first transport format or a second transport format to transmit information corresponding to an input symbol sequence. The transport formats fit information into a timeslot having a predetermined duration. Based upon the selected transport format, either the information is created from the input symbol sequence using the first transport format or is created from the input symbol sequence using the second transport format. Creating the information for transmission using the first transport format applies a spreading code to the input symbol sequence. The information for transmission is transmitted in a selected timeslot having the predetermined duration. Creating and transmitting the information using the first transport format causes the transmitted information to occupy a first frequency band. Creating and transmitting the information using the second transport format causes the transmitted information to occupy a second frequency band that partially overlaps the first frequency band. US2007201408 describes transmitting with WCDMA and Interleaved Frequency Division Multiple Access (IFDMA) with cyclic prefix in parallel in uplink (UL). The base station transmitted to is aware of the transmission format and equipped to handle it.

SUMMARY

It is an objective of the present disclosure to alleviate a problem with the prior art by providing methods and devices for enabling legacy equipment to handle modified chip sequences.

According to an aspect of the present disclosure, there is provided a method of producing a chip block for wireless transmission in a Direct Sequence Code Division Multiple Access (DS-CDMA) communication system. The method comprises spreading a symbol over at least one chip block. The method also comprises segmenting the chip block to form a first sub-block of the chip block, said first sub-block being arranged for containing a first number of chips. The method also comprises segmenting the chip block to form a second sub-block of the chip block. The second sub-block is separate from said first sub-block and is arranged for containing a second number of chips. The method also comprises arranging a first sub-sequence of chips furthest to a first end of the chip block in the first sub-block. The first sub-sequence is identical to a second sub-sequence furthest to a second end of the chip block in the second sub-block, whereby the sub sequences form a cyclic prefix of the chip block. The method also comprises modifying at least one chip contained in the first sub-block and not being part of the first sub-sequence. The modifying is dependent on said first sub-sequence such that the symbol can be at least partially despread from the chip block.

According to another aspect of the present disclosure, there is provided a chip block for wireless transmission in a Direct Sequence Code Division Multiple Access (DS-CDMA) communication system. The chip block comprises a sequence of chips to which a symbol has been spread. The chip block comprises a first sub-block, said first sub-block containing a first number of chips of the sequence of chips. The chip block also comprises a second sub-block. The second sub-block is separate from the first sub-block and contains a second number of chips of the sequence of chips. The chip block comprises a first sub-sequence of chips contained in the first sub-block and positioned furthest to a first end of the chip block. The chip block also comprises a second sub-sequence of chips contained in the second sub-block. The second sub-sequence is identical to the first sub-sequence and positioned furthest to a second end of the chip block. The chip block comprises at least one modified chip contained in the first sub-block and not being part of the first sub-sequence of chips. The modified chip has been modified dependent on the first sub-sequence such that the symbol can be at least partially de-spread from the chip block. The method aspect of the present disclosure may be used to produce the chip block herein discussed.

According to another aspect of the present disclosure, there is provided a communication terminal for wireless communication in a Direct Sequence Code Division Multiple Access (DS-CDMA) communication system. The terminal has been assigned N spreading codes for obtaining data symbols from a chip block according to the chip block aspect of the present disclosure. The terminal comprises a radio receiver configured for receiving the chip block. The terminal also comprises a processor associated with the receiver and configured for despreading less than all of the N spreading codes in the first sub-block and for despreading all of the N spreading codes in the second sub-block. N is an integer.

According to another aspect of the present disclosure, there is provided a Radio Base Station (RBS) configured for producing a chip block for wireless transmission in a Direct Sequence Code Division Multiple Access (DS-CDMA) communication system. The RBS is provided with means for performing the method aspect of the present disclosure. More particularly, the RBS comprises means for spreading a symbol over at least one chip block. The RBS also comprises means for segmenting the chip block to form a first sub-block of the chip block. The first sub-block is arranged for containing a first number of chips. The RBS also comprises means for segmenting the chip block to form a second sub-block of the chip block. The second sub-block is separate from said first sub-block and is arranged for containing a second number of chips. The RBS also comprises means for arranging a first sub-sequence of chips furthest to a first end of the chip block in the first sub-block. The first sub-sequence is identical to a second sub-sequence furthest to a second end of the chip block in the second sub-block. The RBS also comprises means for modifying at least one chip contained in the first sub-block and not being part of the first sub-sequence. The modifying is dependent on the first sub-sequence such that the symbol can be at least partially despread from the chip block.

According to another aspect of the present disclosure, there is provided a Radio Base Station (RBS) configured for producing a chip block for wireless transmission in a Direct Sequence Code Division Multiple Access (DS-CDMA) communication system. The RBS comprises a processor associated with a transmitter. The processor is configured for performing the method aspect of the present disclosure. More particularly, the processor is configured for spreading a symbol over at least one chip block. The processor is also configured for segmenting the chip block to form a first sub-block of the chip block, the first sub-block being arranged for containing a first number of chips. The processor is also configured for segmenting the chip block to form a second sub-block of the chip block. The second sub-block is separate from said first sub-block and is arranged for containing a second number of chips. The processor is also configured for arranging a first sub-sequence of chips furthest to a first end of the chip block in the first sub-block. The first sub-sequence is identical to a second sub-sequence furthest to a second end of the chip block in the second sub-block. The processor is also configured for modifying at least one chip contained in the first sub-block and not being part of the first sub-sequence. The modifying is dependent on the first sub-sequence such that the symbol can be at least partially de-spread from the chip block.

According to another aspect of the present disclosure, there is provided a computer program for producing a chip block for wireless transmission in a Direct Sequence Code Division Multiple Access (DS-CDMA) communication system. The computer program comprises computer program code which, when run on a processor associated with a radio transmitter, causes the processor to perform the method aspect of the present disclosure. More particularly, the processor is caused to spread a symbol over at least one chip block. The processor is also caused to segment the chip block to form a first sub-block of the chip block, said first sub-block being arranged for containing a first number of chips. The processor is also caused to segment the chip block to form a second sub-block of the chip block. The second sub-block is separate from the first sub-block and is arranged for containing a second number of chips. The processor is also caused to arrange a first sub-sequence of chips furthest to a first end of the chip block in the first sub-block. The first sub-sequence is identical to a second sub-sequence furthest to a second end of the chip block in the second sub-block. The processor is also caused to modify at least one chip contained in the first sub-block and not being part of the first sub-sequence. The modifying is dependent on said first sub-sequence such that the symbol can be at least partially despread from the chip block.

According to another aspect of the present disclosure, there is provided a computer program product comprising a computer program, according to the computer program aspect of the present disclosure, and a computer readable means on which the computer program is stored.

It is an advantage provided by the present disclosure that a symbol can be at least partially despread from the first sub-block, even though said first sub-block has been modified to comprise a cyclic prefix. According to the present disclosure, this is achieved by modifying at least one chip contained in the first sub-block and not being part of the first sub-sequence, the modifying being dependent on said first sub-sequence such that the symbol can be at least partially despread from the chip block. Thus, one or several chips of the first sub-block is/are modified in view of the cyclic prefix such that the symbol which has been spread over the sub-block (and possibly also over other sub-blocks) can be obtained when it is despread from the sub-block, and any other sub-block(s) it was spread over, regardless of the inclusion of the cyclic prefix in the sub-block. Put another way, the same result can be obtained when despreading the sub-block with cyclic prefix and chip(s) modified in view of the cyclic prefix, as would have been obtained had the sub-block been despread without first having been provided with an arranged cyclic prefix and modified chip(s). The modified chip(s) thus counteracts the effect of the cyclic prefix when the symbol is despread. By means of the embodiments of the present disclosure, legacy devices arranged for receiving DS-CDMA radio signals which are not configured for handling cyclic prefixes can successfully despread symbol(s) using the first sub-block without being affected by the cyclic prefix or at all being aware of the cyclic prefix.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which:

FIG. 4 is a schematic flow chart of an embodiment of a method of the present disclosure.

FIG. 5 is a schematic block diagram of an embodiment of a FIG. 6 is a schematic block diagram of an embodiment of a chip block and its despreading.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

A symbol is the result of data bits, which should be transmitted over a radio interface, being modulated to at least one symbol. The at least one symbol is then spread with a spreading code and a spreading factor to a sequence of chips, which chips can then be transmitted over the radio interface. Data bits and data symbol, as discussed herein relate to data to be transmitted wirelessly between devices such as RBS and terminal, and are in contrast to e.g. bits/symbol related to a cyclic prefix, pilot signalling or control signalling.

A chip block as discussed herein, is a block of chips arranged to be transmitted over a radio interface. The chip block may e.g. be a transport block or part of a transport block as defined in a communication standard of the third generation partnership project (3GPP). The chip block is sometimes herein referred to before symbols are spread to a chip sequence of the chip block. The chip block may thus be regarded as a figurative or empty entity, containing empty or zero-value chips, before symbol(s) are spread to the chip block. Thus, the chip block may be segmented into sub-blocks before or after symbol(s) being spread over it.

A symbol may be spread with a spreading factor (SF) which is less than the number of chips of the chip block, the same as the number of chips in the chip block, or higher than the number of chips in the chip block. If the SF is higher than the number of chips in the chip block, then the symbol is spread to a chip sequence extending over more than one chip block. This is why a symbol is herein said to be spread over at least one chip block, and at least partially despread from the chip block.

Figure 1:
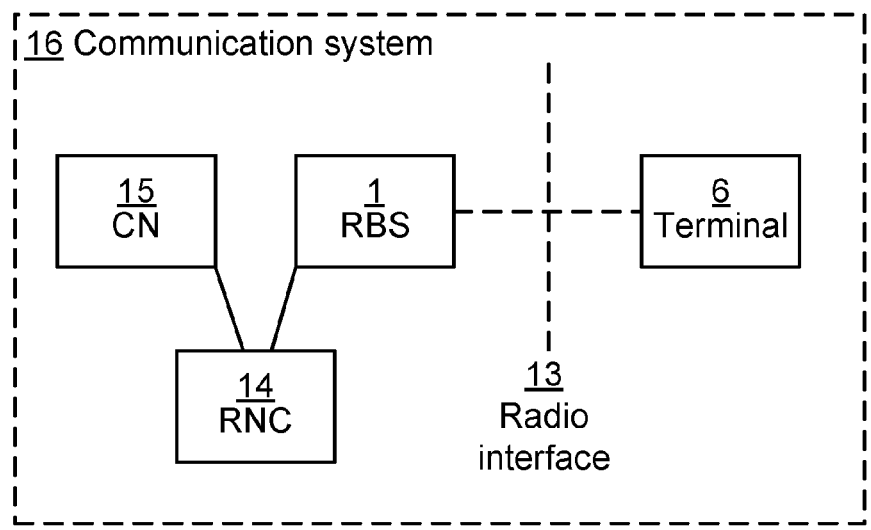
FIG. 1 is a schematic block diagram of an embodiment of a communication system of the present disclosure.

FIG. 1 illustrates an embodiment of a communication system 16 of the present disclosure. A radio access network (RAN) comprises at least one radio base station (RBS) 1. The RAN implements a radio access technology (RAT) in accordance with a DS-CDMA communication standard. The RBS 1 is connected to a core network (CN) 15. Depending on the communication standard used, the RBS 1 may be connected directly to the CN 15, e.g. in accordance with a Long Term Evolution (LTE) communication standard, or via a RAN node 14 such as a Radio Network Control (RNC) node in accordance with a WCDMA communication standard. At least one communication terminal 6 is configured for communication with/via the RBS 1 over a radio interface 13. The communication system 16 is configured in accordance with a DS-CDMA communication standard, and the RBS 1 and the terminal 6, respectively, are configured for wireless communication in accordance with said DS-CDMA communication standard. The DS-CDMA communication standard may e.g. be an LTE standard, a WCDMA standard and/or a HSPA standard, but the present disclosure is relevant also for other DS-CDMA communication standards.

Figure 2:
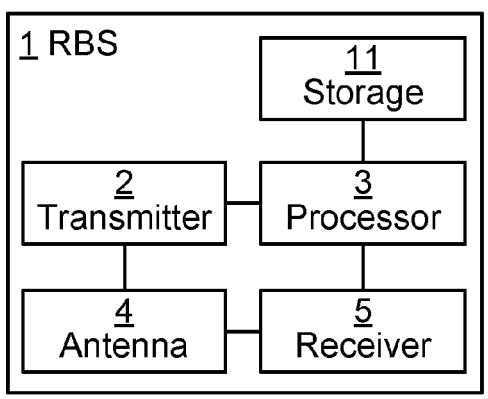
FIG. 2 is a schematic block diagram of an embodiment of a radio base station (RBS) of the present disclosure.

FIG. 2 illustrates an embodiment of an RBS 1 of the present disclosure. The RBS 1 may be any type of suitable RBS configured to serve/be connected to a wireless communication terminal in accordance with a DS-CDMA communication standard. The RBS 1 comprises a processor or central processing unit (CPU) 3. The processor 3 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 3 is configured to run one or several computer program(s) or software stored in a storage unit or memory 11. The storage unit 11 is regarded as a computer readable means and may e.g. be in the form of a Random Access Memory (RAM), a Flash memory or other solid state memory, or a hard disk. The processor 3 is also configured to store data in the storage unit 11, as needed. The RBS 1 also comprises a transmitter 2, a receiver 5 and an antenna 4, which may be combined to form a transceiver or be present as distinct units within the RBS 1. The transmitter 2 is configured to cooperate with the processor 3 to transform data bits, to be transmitted over the radio interface 13, to a suitable radio signal comprising chip blocks in accordance with the RAT used by the RAN via which the data bits are to be transmitted. The receiver 5 is configured to cooperate with the processor 3 to transform a received radio signal to transmitted data bits. The antenna 4 may comprise a single antenna or a plurality of antennas, e.g. for different frequencies and/or for MIMO (Multiple Input Multiple Output) communication. The antenna 4 is used by the transmitter 2 and the receiver 5 for transmitting and receiving, respectively, radio signals. The storage unit 11 is configured for containing software 71 (FIG. 9) stored in the storage unit. The software is configured to be run on the processor 3 for configuring the processor for performing at least a part of a method discussed herein. The software may have been pre-installed in the storage unit upon manufacture of the RBS 1. Alternatively, the software 71 may have been downloaded and installed to the storage unit 11 by an operator of the RBS 1 in cooperation with the processor 3.

The RBS 1 may be an old (legacy) RBS, comprising a processor 3 which is not configured for producing a chip block with a cyclic prefix to be sent by the transmitter (2) and/or for handling a cyclic prefix in chip blocks of a radio signal received by the receiver 5. Alternatively, the RBS 1 may be a more modern RBS which is cyclic prefix aware and thus comprising a processor 3 which is configured for producing a chip block with a cyclic prefix to be sent by the transmitter (2) and/or for handling a cyclic prefix in chip blocks of a radio signal received by the receiver 5. The processor 3 of the cyclic prefix aware RBS 1 is configured for despreading less than all of the spreading codes in a first sub-block of a chip block (which sub-block comprises a cyclic prefix) and for despreading all of the spreading codes in the other sub-blocks of the chip block.

Figure 3:
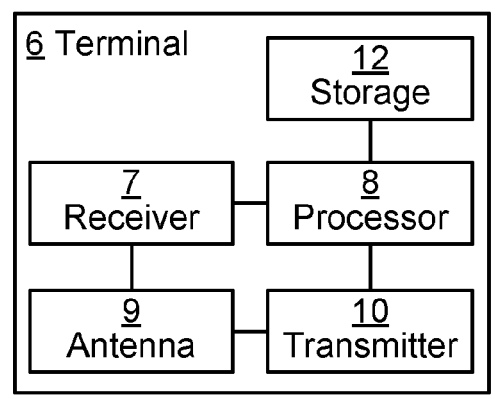
FIG. 3 is a schematic block diagram of an embodiment of a wireless communication terminal of the present disclosure.

FIG. 3 illustrates an embodiment of a communication terminal 6 of the present disclosure. The communication terminal 6 may be any type of suitable terminal configured to be connected to a RBS 1 in accordance with a DS-CDMA communication standard. The terminal 6 may be a mobile communication terminal such as a mobile phone or a portable computer, or the it may be a stationary terminal such as a household appliance (e.g. a fridge or freezer) or an energy management gateway. The communication terminal 6 comprises a processor or central processing unit (CPU) 8. The processor 8 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 8 is configured to run one or several computer program(s) or software stored in a storage unit or memory 12. The storage unit 12 is regarded as a computer readable means and may e.g. be in the form of a Random Access Memory (RAM), a Flash memory or other solid state memory, or a hard disk. The processor 8 is also configured to store data in the storage unit 12, as needed. The communication terminal 6 also comprises a transmitter 10, a receiver 7 and an antenna 9, which may be combined to form a transceiver or be present as distinct units within the communication terminal 6. The transmitter 10 is configured to cooperate with the processor 8 to transform data bits, to be transmitted over the radio interface 13, to a suitable radio signal comprising chip blocks in accordance with the RAT used by the RAN via which the data bits are to be transmitted. The receiver 7 is configured to cooperate with the processor 8 to transform a received radio signal to transmitted data bits. The antenna 9 may comprise a single antenna or a plurality of antennas, e.g. for different frequencies and/or for MIMO (Multiple Input Multiple Output) communication. The antenna 9 is used by the transmitter 10 and the receiver 7 for transmitting and receiving, respectively, radio signals. The storage unit 12 is configured for containing software 71 (FIG. 9) stored in the storage unit. The software is configured to be run on the processor 8 for configuring the processor for performing at least a part of a method discussed herein. The software may have been pre-installed in the storage unit upon manufacture of the communication terminal 6. Alternatively, the software 71 may have been downloaded and installed to the storage unit 12 by a user of the communication terminal 6 in cooperation with the processor 8.

The terminal 6 may be an old (legacy) terminal, comprising a processor 8 which is not configured for handling a cyclic prefix in chip blocks of a radio signal received by the receiver 7. Alternatively, the terminal 6 may be a more modern terminal which is cyclic prefix aware and thus comprising a processor 8 which is configured for handling a cyclic prefix in chip blocks of a radio signal received by the receiver 7. As an example, the terminal 6 has been assigned N spreading codes for obtaining data symbols 21 from the chip block 17, N being a positive integer. The processor 8 of the cyclic prefix aware terminal 6 may then be configured for despreading less than all of the N spreading codes in a first sub-block of a chip block (which sub-block comprises a cyclic prefix) and for despreading all of the N spreading codes in the other sub-blocks of the chip block.

In some embodiments, the terminal 6 comprises a processor 8 configured for producing a chip block as discussed herein (reference 17 in subsequent figures). The terminal 6 also comprises a transmitter 10 configured for sending the chip block 17 to an RBS 1 over a radio interface.

In accordance with the present disclosure, the RBS 1 and/or the terminal 6 is configured for performing any embodiment of the method of producing a chip block for wireless transmission in a DS-CDMA communication system 16 discussed herein, unless specifically stated otherwise. In particular, the respective processors 3 of the RBS or 8 of the terminal may be configured for performing any or all of the steps of any embodiment of a method of the present disclosure.

FIG. 4 illustrates an embodiment of a method of the present disclosure. The method relates to producing a chip block for wireless transmission in a Direct Sequence Code Division Multiple Access (DS-CDMA) communication system 16 (see FIG. 1).

A symbol is spread 101 over/to at least one chip block. The symbol may have been the result of data bits to be transmitted, e.g. by a RBS 1 or terminal 6 discussed above, the data bits having been modulated to form the (data) symbol. Alternatively, the symbol may be the result of control bits or pilot bits, or symbols to be transmitted, which have been modulated to form the symbol. The symbol is spread to a chip sequence of the chip block.

The chip block is segmented 102 to form a first sub-block of the chip block, said first sub-block being arranged for containing a first number of chips of the chip block. The chip block is also segmented 103 to form a second sub-block of the chip block, said second sub-block being separate from said first sub-block and being arranged for containing a second number of chips. Is some embodiments, the number of chips in the first sub-block is the same as the number of chips in the second sub-block. The first and second sub-blocks may be code blocks, i.e. a segmentation made of a transmitted chip block where the chip block is despread/decoded one sub-block at a time. Alternatively or additionally, the sub-blocks may be segmented such that they each contain a number of chips which is the same as a spreading factor used for spreading symbol(s) to the chip sequence of the chip block. Herein this is exemplified with sub-blocks each having a chip sequence consisting of 16 chips on which symbols of SF16 are spread such that the symbols can be obtained by despreading an individual sub-block of 16 chips. In accordance with some embodiments, the chip block is segmented 102, 103 prior to the symbol being spread 101 thereto, while in other embodiments the chip block is segmented 102, 103 after the symbol has been spread 101 thereto, and in yet other embodiments the chip block is segmented 102, 103 while the symbol is being spread 101 thereto. The segmenting 102, 103 of the chip block may be defined in the communication standard used. In addition to the symbols spread over only one sub-block (here SF16) one or more symbols may be spread with an SF which is larger than the number of chips of the sub-block. For instance, SF256 symbol(s) may be spread over the whole chip block 17 in this example. Such SF>16 symbols may e.g. be for transmitting control bits or pilot bits. In some embodiments of the present invention, such a symbol which is spread over more chips than are contained in a single sub-block, is the symbol which is spread over the chip block 17 and which can at least partially be despread from said chip block, in accordance with the present disclosure. Such a symbol may in some embodiments have a spreading factor which is the same as the number of chips of the chip block 17.

A first sub-sequence of chips are arranged 104 in the first sub block. The sub-sequence is arranged in the sub-block such that it is positioned furthest to a first end of the chip block, i.e. the sub-sequence consists of the chip or chips furthest to a first end of the chip block such that a chip of the sub-sequence is only adjacent to one other chip of the chip block, on the other side e.g. being adjacent to a chip of another chip block or not being adjacent to a chip (if e.g. the chip block is first or last of a radio signal). The first sub-sequence is identical to a second sub-sequence which is similarly positioned in the second sub-block and furthest to a second end of the chip block. That the sub-sequences are identical implies that they consist of the same number of chips, each of which are identical and in the same order in both sub-sequences. By this arranging 104 of sub-sequence, a cyclic prefix of the chip block is formed.

At least one chip of the first sub-block, which chip, or chips, is not part of the first sub-sequence, is modified 105. The modifying 105 is dependent on said first sub-sequence such that the symbol which is spread 101 over the chip block can be at least partially despread from the chip block. As mentioned above, the modified chip or chips is modified to counteract the way the arranging 104 of the cyclic prefix affects the despreading of the symbol from the first sub-block of the chip block. Thus, the result of a subsequent despreading of the first sub-block will be the same after the modification 105 as the result of despreading would have been if no cyclic prefix had been arranged 104 and no modification 105 had been made. That the symbol is "at least partially" despread is in regard to the situation, as discussed above, where the symbol is spread to a chip sequence which extends beyond the chip block with the cyclic prefix here discussed. If the symbol is only spread over the chip block, being spread to at most as many chips as are contained in the chip block, the symbol can be fully despread from the chip block by means of the modification 105 of at least one chip contained in the first sub-block and not being part of the first sub-sequence. As exemplified below, in some embodiments, the modification is made after the chip/chips have been created (see FIG. 13) in the transmitting device (e.g. RBS 1 or terminal 6), but in other embodiments, the modification is made by spreading modification symbols to the first sub-block such that the symbols or symbols carrying data or information in combination with the modification symbols forms the cyclic prefix and the at least one modified 105 chip (see FIG. 14).

Figure 11:
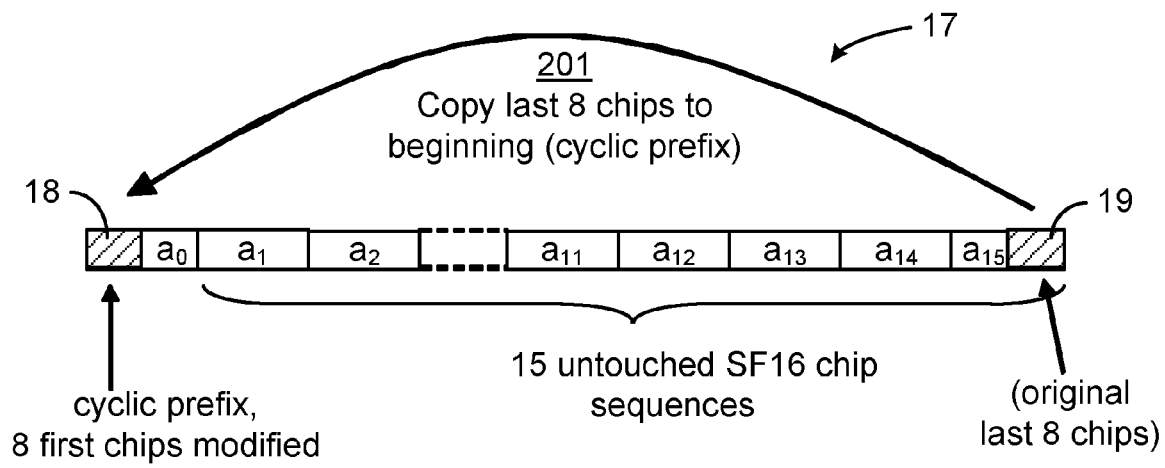
FIG. 11 is a schematic block diagram of an embodiment of a chip block of the present disclosure, illustrating an embodiment of creating a cyclic prefix.
Figure 12:
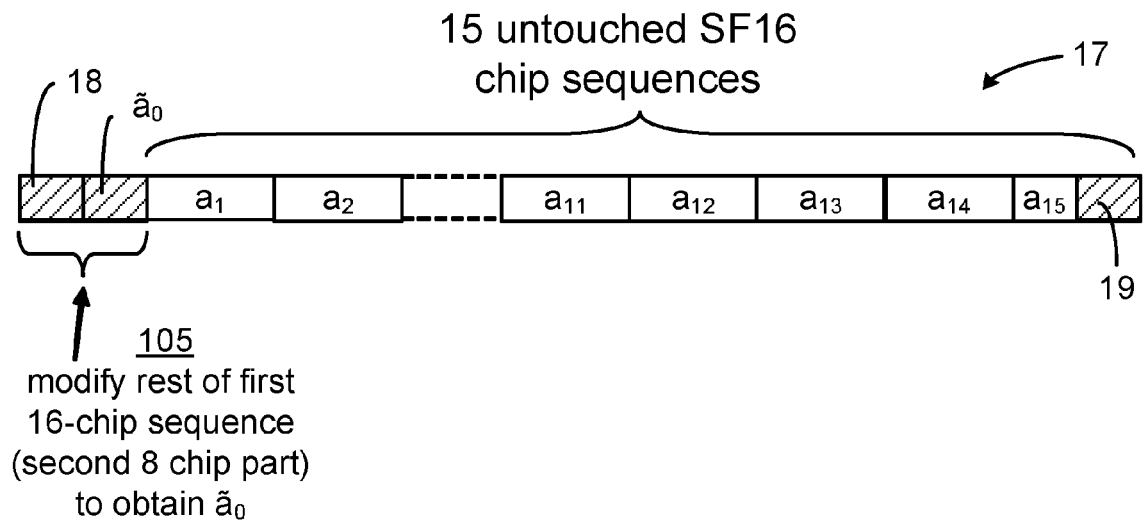
FIG. 12 is a schematic block diagram of an embodiment of a chip block of the present disclosure, with a cyclic prefix.

FIG. 5 illustrates another embodiment of the method of the present disclosure. In this embodiment the spreading 101, segmenting 102 & 103, the arranging 104 and the modifying 105 steps are as discussed in respect of FIG. 4. However, the arranging 104 more particularly comprises copying 201 the second sub-sequence of chips to the first sub-block. This is one example of how the first sub-sequence can be arranged 104 to be identical to the second sub-sequence and form a cyclic prefix of the chip block. An embodiment of this is also discussed in the examples below and is shown in FIG. 11.

Now, reference is made to both FIGS. 4 and 5. In some embodiments, the first sub-sequence comprises the chip arranged to be transmitted first of the chip sequence of the chip block, and the second sub-sequence comprises the chip arranged to be transmitted last of the chip sequence of the chip block. In other embodiments the second sub-sequence comprises the chip arranged to be transmitted first of the chip sequence of the chip block, and the first sub-sequence comprises the chip arranged to be transmitted last of the chip sequence of the chip block. Thus the first sub-block may contain chips which are arranged to be transmitted first among the chips of the chip block, and the second sub-block may contain chips which are arranged to be transmitted last among the chips of said chip block.

If the symbol is spread 101 only over the first sub-block, being spread to at most as many chips as are contained in the first sub-block, the symbol can be fully despread and obtained from the first sub-block by means of the modification 105 of the at least one chip contained in the first sub-block and not being part of the first sub-sequence.

The size of the first and second sub-blocks are conveniently the same, i.e. the first number of chips is conveniently the same as the second number of chips. This corresponds to many wireless communication standards where a chip block is segmented into several same-size sub-blocks. If e.g. a spreading factor which is less than the number of chips contained in the chip block is used, the sub-blocks may consist of as many chips as the SF. In examples below, a SF of 16 is used and the size of the sub-blocks is 16 chips. The size (in number of chips) of the chip block may then be an integer multiple of the sub-block size which is the same as an integer multiple of a SF used. It should be noted that different SFs may be used for spreading different symbols over the same chip block. Other SF may then conveniently be a power of 2, e.g. 2, 4, 8, 16, 32, 64, 128, 256, in accordance with the orthogonal variable spreading factor (OVSF) codes used in WCDMA. The SF may also conveniently be an integer multiple of the sub-block size. The chip block may contain any number of sub-blocks positioned between the first and second sub-blocks. The chip block may e.g. contain between 2 and 32 sub-blocks, including the first and second sub-blocks discussed herein. In the examples below, a chip block of 16 sub-blocks each containing 16 chips, giving the chip block a size of 16×16=256 chips, is used as a non-limiting example.

The first and second sub-sequences can be defined to have any suitable length (in number of consecutive chips). The sub-sequences have a length of at least one chip. Conveniently, the sub-sequences have a length which is longer (converted into transmission time) than the channel impulse response of the transmission, in order for the cyclic prefix to fully remove interference between different chip blocks, as discussed above. The sub-sequences have a length which is less than the size of the first sub-block, since at least one of the chips of the first sub-block, which chip is not part of the first sub-sequence, is modified 105 in accordance with the method of the present disclosure. In some embodiments, the sub-sequences, in view of the above criteria for its length, have a length of at least 4 chips and at most 15 chips, e.g. 6, 7, 8, 9 or 10 chips, allowing for a sub-block size of e.g. 16 chips, but other sub-block sizes, and thus sub-sequence lengths, are also contemplated.

At least one chip, which chip is contained in the first sub-block but not part of the first sub-sequence, is modified 105. In some embodiments, all/each of the chips in the first sub-block which are not part of the first sub-sequence are modified 105. In other embodiments, at least one chip contained in the first sub-block and not part of the first sub-sequence is not modified, and can be used for e.g. transmitting a data, control or pilot signal symbol.

FIG. 6 schematically illustrates an embodiment of a chip block 17 of the present disclosure and as discussed herein e.g. above in relation to the method of the present disclosure. A chip block 17 contains a sequence of chips 20. The chip block and the chips 20 therein have been produced by a transmitting device (e.g. the RBS 1 or the terminal 6). A receiving device (e.g. the RBS 1 or the terminal 6) can then despread 501 the chip block to obtain one or several symbol(s) 21.

Figure 7:
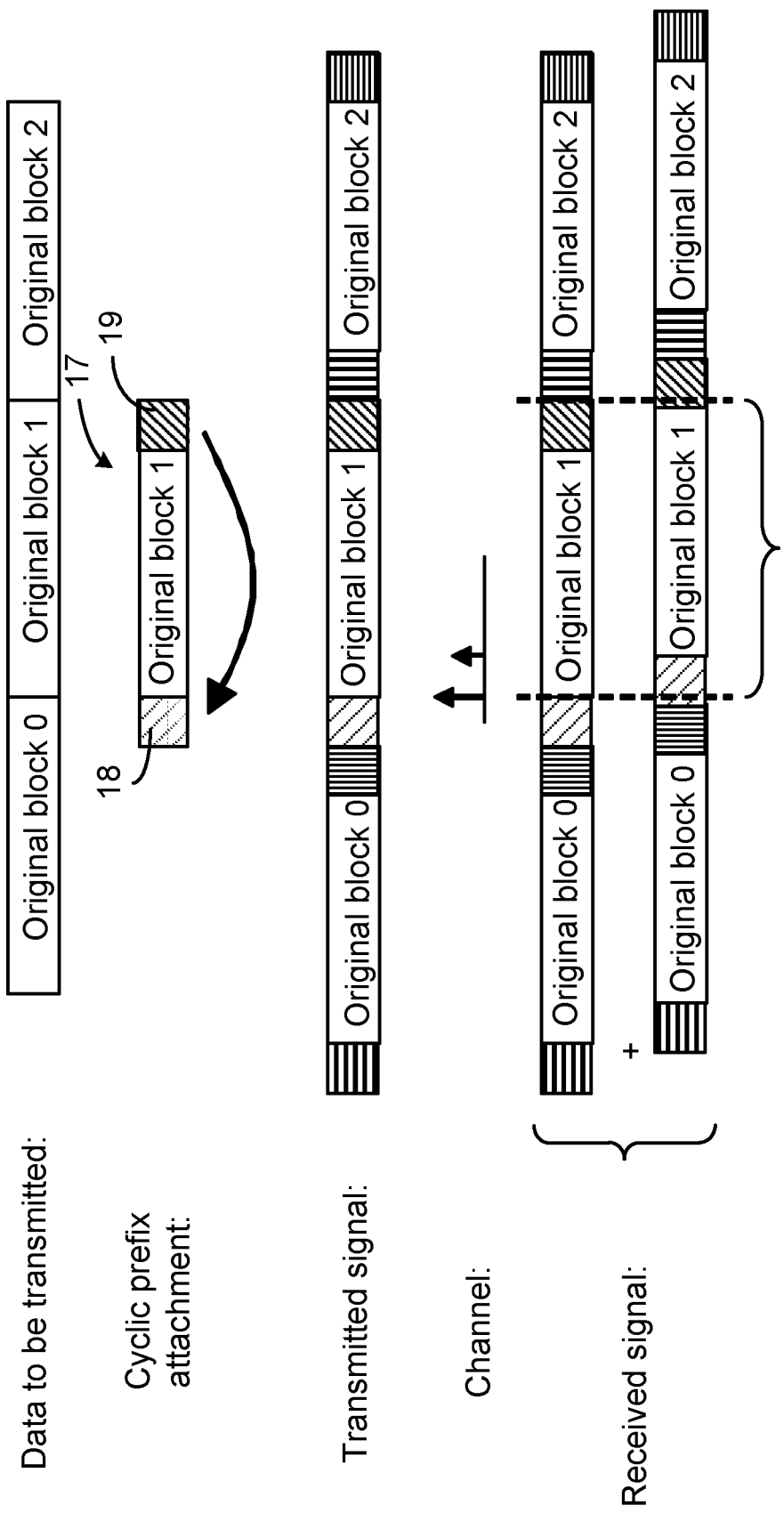
FIG. 7 is a schematic block diagram of an embodiment of a radio signal, to be transmitted, as transmitted and as received.

FIG. 7 illustrates an embodiment of a signal comprising an embodiment of chip blocks 17 of the present disclosure. The FIG. 7 also illustrates how the signal is produced by a transmitting device, how it is as transmitted and how it may be as received by a receiving device. The signal comprising data to be transmitted is made up of a plurality of chip blocks 17 in sequence. A cyclic prefix 18 of each of the chip blocks 17 is arranged 104 in accordance with the discussion of the method above. The cyclic prefix, in the form of the first sub-sequence 18 as discussed herein, is identical to the second sub-sequence 19 at the end of the chip block 17. The signal that then is transmitted is made up of a sequence of chip blocks 17, each with a cyclic prefix 18. Due to the channel impulse response, a plurality of copies arrive to the receiving device via different paths and at slightly different times, making the different copies slightly parallel displaced in time in relation to each other. However, by virtue of the cyclic prefix 18, the received chip block, as indicated by the dashed lines in FIG. 7, is received such that it only exhibits chip block internal interference (intra block interference), without interference between the different chip blocks (inter block interference).

Figure 8:
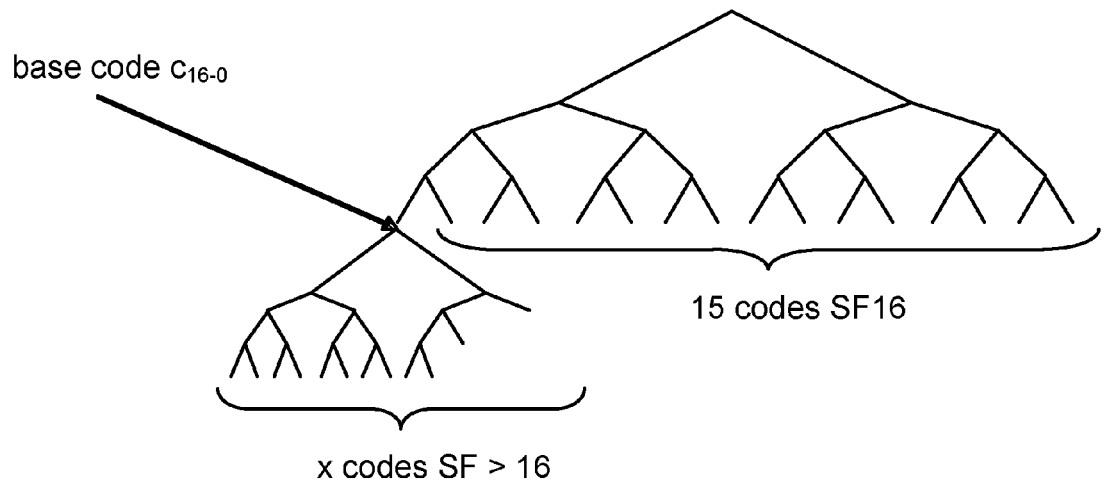
FIG. 8 is a schematic tree diagram over different codes available, and there relationships to each other, in DS-CDMA communication according to an embodiment of the present disclosure.

FIG. 8 illustrates an embodiment of a spreading code tree for spreading symbols 21 to a chip sequence of a radio signal made up of chip blocks 17 (see FIG. 7). In the embodiment of FIG. 8, fifteen codes of SF 16 are used. Thus one branch of the tree is free for spreading codes of SF>16. These codes with SF>16 all comprise the same base code $C_{16-0}$ since they are part of the same branch on the SF 16 level of the tree. Thus, symbols can be spread over the chip block 17 with a plurality of different spreading factors. This is used and exemplified in the examples below. For example, up to sixteen SF 256 codes, which all have the same base code $C_{16-0}$ can be used.

Figure 9:
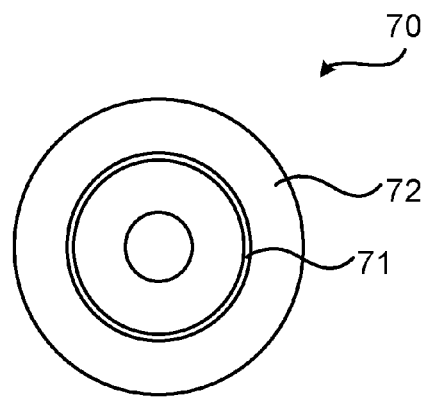
FIG. 9 is a schematic illustration of an embodiment of a computer program product of the present disclosure.

FIG. 9 illustrates a computer program product 70 or a computer readable medium 70 comprising a computer program 71 in the form of computer-executable components 71. The computer program/computer-executable components may be configured to cause a device (e.g. a RBS 1 or terminal 6) to perform an embodiment of any embodiment of a method of the present disclosure. The computer program/computer-executable components may be run on the processing unit 3 or 8, respectively, of the device 1 or 6 for causing the device to perform the method. The computer program product/computer readable medium 70 may e.g. be comprised in a storage unit or memory 11 or 12 comprised in the device 1 or 6 and associated with the processing unit 3 or 8, respectively. Alternatively, the computer program product/computer readable medium 70 may be, or be part of, a separate, e.g. mobile, storage means, such as a computer readable disc, e.g. CD or DVD or hard disc/drive, or a solid state storage medium, e.g. a RAM or Flash memory.

EXAMPLES

The examples are described with reference to the figures, in particular to FIGS. 10-18.

To exemplify embodiments, the following setup is used:
HSPA Downlink (DL).
One cyclic prefix-aware high data rate (HDR) terminal 6 that uses up to fifteen HSDPA channelization codes of spreading factor sixteen (SF16).
For example a modern wireless communication terminal 6 which is aware that a cyclic prefix is used in DL transmissions.
Zero or more cyclic-prefix-unaware legacy user terminals 6 with codes of SF>16.
This can be voice users, control signalling, pilot signals, etc.
Zero or more cyclic-prefix-unaware legacy user terminals 6 of SF16.
This can be legacy HSDPA HDR wireless communication terminals.
The maximum radio channel impulse response length is 2 μs (somewhat less than 8 chips, if the chip rate is 3840000 chips per second).
The cyclic prefix 18 is eight chips 20 (somewhat more than 2 μs). If the maximum impulse response time is shorter, a cyclic prefix which is shorter than eight chips may be used instead. Similarly, if the maximum impulse response time is longer, a longer cyclic prefix than eight chips 20 is preferably used. In contrast, the cyclic prefix in LTE is 5 μs or 16 μs.
The size of the chip block 17, including cyclic prefix 18, is 256 chips 20 (corresponds in time to the block size, excluding cyclic prefix, in LTE).

Example 1

Despreading

It is first noted that despreading in WCDMA can be performed in multiple steps. This is for example used in the Fast Hadamard Transform in a similar way as the Fast Fourier Transform. Despreading can be performed recursively: despreading of a code with spreading factor N can be performed by despreading two N/2 codes with post-combination of the results.

In particular, despreading of a SF>16 code is equivalent to despreading of SF16 symbols 21, with post-combination of these symbols. See also FIG. 8.

Example: Two symbols 21, $s_0$ and $s_1$, are transmitted with the SF32-codes
$c_{32-0}$=[1 1 1 1 −1 −1 −1 −1 1 1 1 1 −1 −1 −1 −1|1 1 1 1 −1 −1 −1 −1 1 1 1 1 −1 −1 −1 −1]
and
$c_{32-1}$=[1 1 1 1 −1 −1 −1 −1 1 1 1 1 −1 −1 −1 −1|−1 −1 −1 −1 1 1 1 1 −1 −1 −1 −1 1 1 1 1].

Note that the two SF32 channelization codes $c_{32-0}$ and $c_{32-1}$ are composed of one SF16 code $c_{16-0}$ as
$c_{32-0}$=[$c_{16-0}$ $c_{16-0}$]
$c_{32-1}$=[$c_{16-0}$ −$c_{16-0}$]
if
$c_{16-0}$=[1 1 1 1 −1 −1 −1 −1 1 1 1 1 −1 −1 −1 −1].

So, despreading with one of the SF32 codes is the same as despreading first and second 16-chip sub-blocks to obtain the partially despread symbols $x_0$ and $x_1$ with SF16-code $c_{16-0}$, and then the final SF32 symbols are post-combined as $s_0$=$x_0$+$x_1$ and $s_1$=$x_0$−$x_1$.

Example 2

Cyclic Prefix Modification −1

Figure 10:
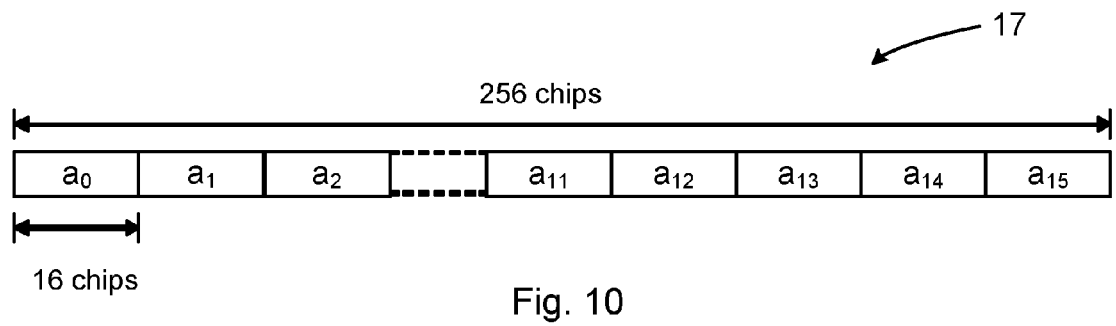
FIG. 10 is a schematic block diagram of an embodiment of a chip block of the present disclosure.

A chip block 17 of 256 chips 20 is ready for transmission, see FIG. 10. Before transmission, the last eight chips 20 are copied 201 to the first eight chips 20 of the chip block 17 such that the first eight chips are the same as the last eight chips, see FIG. 11. Now the block appears to be a block of 248 independent chips 20 (chips number 9 to 256) to which a cyclic prefix 18 of eight chips 20 have been added (the first eight copied-in chips 20). So now the cyclic prefix 18 has been added, but this modification of the sub-block $a_0$ of the chip block 17 is not transparent to legacy terminals since the modification will affect the despreading 501 in the receiver 7 of such legacy terminals 6.

Let's analyze what happens at despreading 501 in the receiver 7:

The despreading 501 for the cyclic prefix-aware terminal 6 is no problem because the last fifteen 16-chip sub-blocks $a_0$-$a_{15}$ are untouched, and the cyclic prefix-aware terminal is aware of the modification that has been performed to the first 16-chip sub-block $a_0$.

For legacy terminals (cyclic prefix-unaware), despreading of all symbols 21 with SF>16 can be seen as first despreading a number of SF16 symbols or 16-chip sub-blocks $a_0$-$a_{15}$, followed by post-processing the results. As only the first 16-chip sub-block $a_0$ has been modified this implies the following requirement on legacy transparency of the cyclic prefix 18:

When the first 16-chip sub-block $a_0$ is despread 501 with spreading code $c_{16-0}$ it must produce the same results as if no modification of the 16-chip sub-block $a_0$ for creating the cyclic prefix of the chip block 17 was made.

Now, let's see how the modification can be performed while fulfilling the legacy transparency requirement. For the moment assume that no SF16 HDR data is transmitted in the first 16-chips $a_0$ (the HDR terminal 6 is cyclic prefix-aware). Then the remaining eight chips 20 (chips 9-16) in the first 16-chip sub-block $a_0$ can be modified 105 to make the cyclic prefix modification transparent to legacy terminals. See FIG. 12.

Thus, the rest of the first 16-chip sub-block $a_0$ (second eight-chip part of $a_0$) is modified 105 such that despreading of the thus modified first 16-chip sub-block $\tilde{a}_0$ with the SF16 base code $c_{16-0}$ gives same results as if no cyclic prefix 18 had been created.

For original first 16-chip sub-block $a_0$:

$$c_{16-0}^T * a_0 = x_0$$

For modified first 16-chip sub-block $\tilde{a}_0$:

$$c_{16-0}^T * \tilde{a}_0 = x_0$$

$c_{16-0}^T$ being the transpose of the vector $c_{16-0}$.

This is can be achieved because although the 8 first chips of $\tilde{a}_0$ are determined by the cyclic prefix constraint, the last 8 chips can be varied to satisfy the despreading constraint, and there is only one legacy transparency constraint (if there is only one legacy terminal 6). So, there are 8 variables and only 1 constraint, or, considering the whole first 16-ship sub-block $a_0$, there are in total 16 variables (chips 20) and 9 constraints (8 controlling the cyclic prefix chips, and 1 for despreading of legacy base code $c_{16-0}$). This means that it is possible use the additional seven degrees of freedom to e.g.:

transmit additional data for the cyclic-prefix aware HDR terminal 6, and/or add additional despreading constraints to enable cyclic prefix-unaware legacy SF16 terminals 6 to be simultaneously scheduled, and/or reduce the power of the modified chips (modification to also transmit data in first 16 chips $a_0$ can increase amplitude of modified chips to satisfy all constraints).

So, the objective to modify a part $a_0$ of the chip block 17 to be transmitted so that it appears as a chip block 17 with cyclic prefixes attached, and despreading of certain codes gives same results as without the cyclic prefix 18 can be expressed mathematically (using notation as above and in FIGS. 10 to 12 and Matlab-type indexing):

minimize $\|\tilde{a}_0\|^2$ subject to $$\tilde{a}_0(1:8) = a_{15}(9:16)$$

$$c_{16-0}^T * \tilde{a}_0 = x_0$$

(possibly also $c_{16-1}^T * \tilde{a}_0 = x_1$, etc)

Legacy terminals 6 can also use SF16 codes and be transmitted in parallel by including additional constraints such as $c_{16-1}^T * \tilde{a}_0 = x_1$ and $c_{16-2}^T * \tilde{a}_0 = x_2$ etcetera. In this way, high data rate legacy terminals can be scheduled simultaneously with high data rate cyclic-prefix aware terminals. However, if too many SF16 codes are used for legacy terminals, the amplitude of the modified part of the chip block 17 can increase, as illustrated in the simulation examples that are discussed below.

Other objective functions can be envisioned, for example to minimize the maximum absolute value, or to make the chips 20 have as close to unit amplitude as possible.

Figure 13:
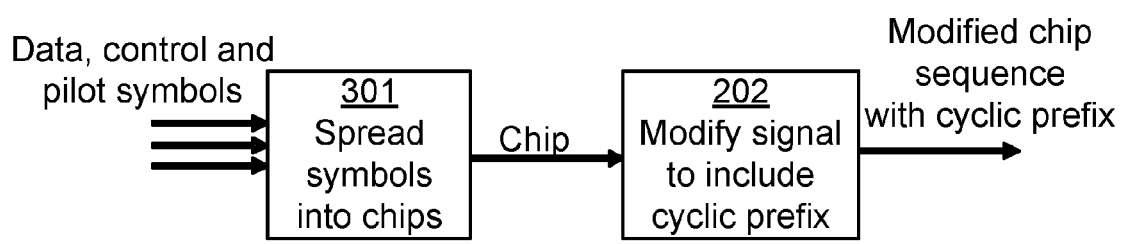
FIG. 13 is a schematic flow chart of an embodiment of a method of modifying a chip block.
Figure 14:
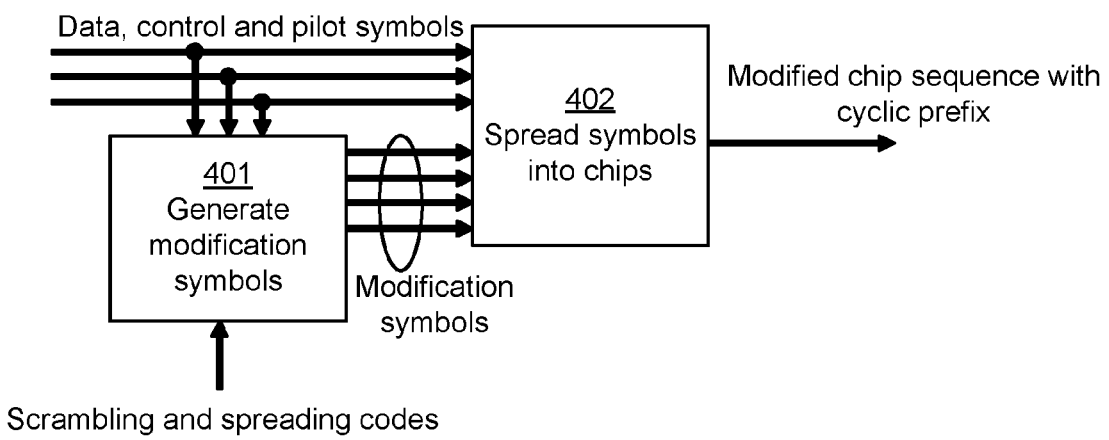
FIG. 14 is a schematic flow chart of another embodiment of a method of modifying a chip block.

This approach, to first spread 301 symbols 20 to a first chip sub-block $a_0$, and then to modify 302 the sub-block $a_0$ to create a cyclic prefix 18 in the first part of it as a second step, is illustrated in FIG. 13 and can be used for some embodiments.

The described modification will make the transmitted chip sequence (radio signal) appear as blocks 17 of 248 chips 20 with a cyclic prefix 18 of eight chips attached to each block 17. If the channel impulse response is shorter than 8 chips, the convolution of the transmitted signal with the channel will appear as a cyclic convolution of the 248 chip block and the channel impulse response. This is the goal of adding a cyclic prefix and facilitates for example frequency domain receiver processing.

Example 3

Cyclic Prefix Modification −2

The modifications described above (copying 201 sub-sequence 19 to create a cyclic prefix 18, and modifying 105 chips 20 of the first sub-block $a_0$ to make the sub-block $a_0$ legacy transparent) can alternatively be performed on a symbol level, so that modification symbols (not necessarily constrained to a specific symbol constellation alphabet such as quadrature phase-shift keying (QPSK) or 16-QAM (quadrature amplitude modulation)) are spread 402 and combined with the other spread symbols to make the final chip block 17 include a legacy transparent cyclic prefix. To understand this let x denote the block 17 of chips 20 which should be added a cyclic prefix 18. Then the chip sequence x can be expressed in terms of the symbols s that are transmitted during the corresponding time period:

$$x = M * s$$

Here, s is a vector of the symbols 21 that are transmitted during this time period, and M is a matrix where each column consists of the spreading code (channelization and scrambling code) positioned at the chips corresponding to a particular symbol period for a particular symbol in the symbol vector s.

Now, both the spreading matrix M and the symbol vector s can be partitioned into a legacy part and a part that can be used for modification to add a cyclic prefix:

$$M=[M_{legacy}\ M_{modification}],\ s=[s_{legacy}^T\ s_{modification}^T]^T,$$
T denoting transpose.

So, the chip sequence x can be expressed as:

$$x=M*s=M_{legacy}*s_{legacy}+M_{modification}*s_{modification}$$

Whereby the constraint that legacy symbols should not be affected by the modification, and that a cyclic prefix should be present can be expressed with:

$$A=[A_{legacy}^T\ A_{cp}^T]^T$$

where the rows of the matrix $A_{legacy}$ are the despreading sequences that are used to despread the original legacy symbols. The despreading sequences are the complex conjugate of the spreading sequences which are the columns of $M_{legacy}$, so the matrix $A_{legacy}$ can be expressed as $$A_{legacy}=k*M_{legacy}^H,$$

where H denotes hermitian conjugate (conjugate transpose) matrix and k is a scalar scaling coefficient that makes sure that $A_{legacy}*M_{legacy}=I$ where I is the identity matrix.

The matrix $A_{cp}$ is defined as $$A_{cp}=[I\ 0\ -I]$$

where I is the identity matrix of size $N_{cp} \times N_{cp}$ where $N_{cp}$ is the length of the cyclic prefix 18 in chips 20, and 0 is a matrix of size $N_{cp} \times (N_{block}-2*N_{cp})$ where $N_{block}$ is the number of chips 20 in the chip block 17 that is being modified.

Now form a vector b containing the symbols transmitted to legacy UEs ($s_{legacy}$) and zeros:

$$b=[s_{legacy}^T\ 0^T]^T$$

where 0 is a vector of $N_{cp}$ zero elements. Now, the problem can be formulated as:

minimize $\|x\|^2$ by adjusting $s_{modification}$ subject to the constraint $A*x=b$.

The solution, the final chips x or the values of the modification symbols $s_{modification}$, can be found using standard numerical methods. By calculating modification symbols and spreading them just as the legacy data symbols, the same spreading and scrambling structure as today can be used, and the actual modification is performed in the symbol generation process 401, instead of after the generation 402 of the chip sequence. See FIG. 14. This can be beneficial for some transmitter structures. To further make the structure similar to today's transmitters the modification symbols, which have been assumed to be arbitrary symbols, can be constrained to a particular symbol constellation, such as 16-QAM, 64-QAM, QPSK, 4-PAM (pulse-amplitude modulation), BPSK (binary phase-shift keying), etc. Then, however, the constraint can in general not be exactly met. So, for this case, and also for cases where the modification symbols can have arbitrary values, the following problem formulation can be used to find the modification symbols or modified chip sequence instead:

minimize $\|x\|^2+k*\|A*x-b\|^2$ where k is a weight factor that determines how important it is to fulfill the constraint compared to minimizing the chip sequence energy.

In the above description the function to be minimized has been $\|x\|^2$. But in some embodiments other functions, such as the maximum of the absolute values of x, can be used, or the goal might be to make the transmitted chips have as close to unit amplitude as possible.

Example 4

FD Channel Estimation

A possible disadvantage with the procedure described in the preceding examples above is that blocks 17 of length 256−8=248 chips 20 appear as cyclically convolved with the channel, not blocks of length 256 chips. The pilots in HSDPA are of SF256, so if frequency domain (FD) despreading for channel estimation is used, longer blocks 17 are needed to have the complete pilot sequence within one chip block 17, which is beneficial for frequency domain correlation, despreading and channel estimation. There are solutions to this problem, such as:

Use larger blocks 17, such as 512 chips 20. Then, at least the first pilot symbol 21 of 256 chips can be despread in frequency domain.

Use blocks 17 of 256+8 chips=264 chips so that a complete 256 chip block 17 is affected by the cyclic prefix. This however can be problematic for the previous chip block 17 of the radio signal, since the cyclic prefix modification is then performed in that block.

Example 5

Longer Cyclic Prefixes

A longer cyclic prefix can be achieved by modifying a larger part of the first 16-chip sub-block $a_0$ (procedure is then the same as in the examples above), or to use more than one 16-chip sub-block. To modify two SF16 sub-blocks, 32 chips is acceptable if only one SF32 base code is used by legacy terminals 6 (i.e. all legacy terminals' codes are part of that SF32 sub-tree, cf. FIG. 8). It is also acceptable for some cases when both SF32 sub-branches to the same SF16 sub-branch are used.

Example 6

Capability of Receiver

To determine if a receiver, such as a HDR receiver terminal 6 of the above examples, is capable to benefit from the cyclic prefix (i.e. is cyclic prefix-aware) the transmitter (e.g. of the RBS 1), in one embodiment, modifies the chip block 17 to add a cyclic prefix 18 and then evaluates if the receiver of the codes which are assumed to be used for a cyclic prefix-aware receivers are correctly received by the receiver, for example by examining the acknowledgements of correctly received data that the receiver feeds back. In another embodiment, certain receiver categories that indicate whether the receiver is cyclic prefix-aware or not are introduced in the standard.

Example 7

Uplink

Embodiments of the present invention can also be advantageous when used in uplink (UL) signaling, e.g. in HSPA. In the downlink the same signal of chip blocks 17 is received by multiple terminals 6, where one terminal despreads some spreading codes, another one other codes, why it is important to make a modification to the signal that suits both legacy and new, cyclic prefix-aware, terminals 6. In the uplink, the base station 1 despreads all the spreading codes the terminal 6 has used. So, if the base station 1 is a legacy base station, the terminal will transmit in legacy mode (without cyclic prefix 18), if the base station is a cyclic prefix-aware one, the terminal is not restricted on how it can modify the signal, so it can change say the first ten chips 20 of a block 17 of 256 chips. This is acceptable as long as the base station 1 is aware of the modification, because then it will not expect any data in the first ten chips.

So, a problem in the uplink (in analogy with the downlink with both legacy and new terminals 6) is when the terminal is in soft handover with both legacy and cyclic prefix-aware base stations 1, since it then would need to adapt the transmitted signal to suit both legacy and new cyclic prefix-aware base station receivers 5. One option is to disable the cyclic prefix 18 in such a case. But the cyclic prefix should preferably be there without the legacy base station noticing it. The legacy base station 1 will despread all the spreading codes it thinks the terminal has used for data and control signaling, so the result from that despreading should not be changed by the inclusion of the cyclic prefix 18. If it despreads data symbols 21 of SF2, it is only possible to have a one-chip cyclic prefix and modify 105 the other chip for legacy-transparency. If the terminal 6 uses higher spreading factors, like SF16 or higher (longer than the cyclic prefix 18), it is possible to add a cyclic prefix 18 as in the downlink by generating modification symbols and spreading them using "unused codes", codes that the receiver does not expect to carry data symbols from this terminal 6. If SF>16 is used for data, one SF16-subtree is used for data, some for control and the rest can be modified for cyclic prefix and legacy transparency.

Another option in SF2 or SF4 would be to use the first, say, ten chips 20 of the ship block 17 as a cyclic prefix 18 anyway. Because the legacy base station 1 is involved in the reception, only legacy transport formats can be used, and they all include data symbols 21 in these first chips 20. So, there will be errors in the first data symbols because they are replaced by the cyclic prefix 18, but error correcting codes can alleviate a part of this problem. But also the cyclic prefix-aware base station 1 will miss the symbols 21 in the first chips 20 because of the legacy transport format. So both base stations will experience errors in the first data symbols. But the new base station 1 can exploit the cyclic prefix 18 to better detect the other symbols 21, and depending on other factors this gives better performance than transmission without a cyclic prefix 18.

Example 8

Simulation Results

Figure 15:
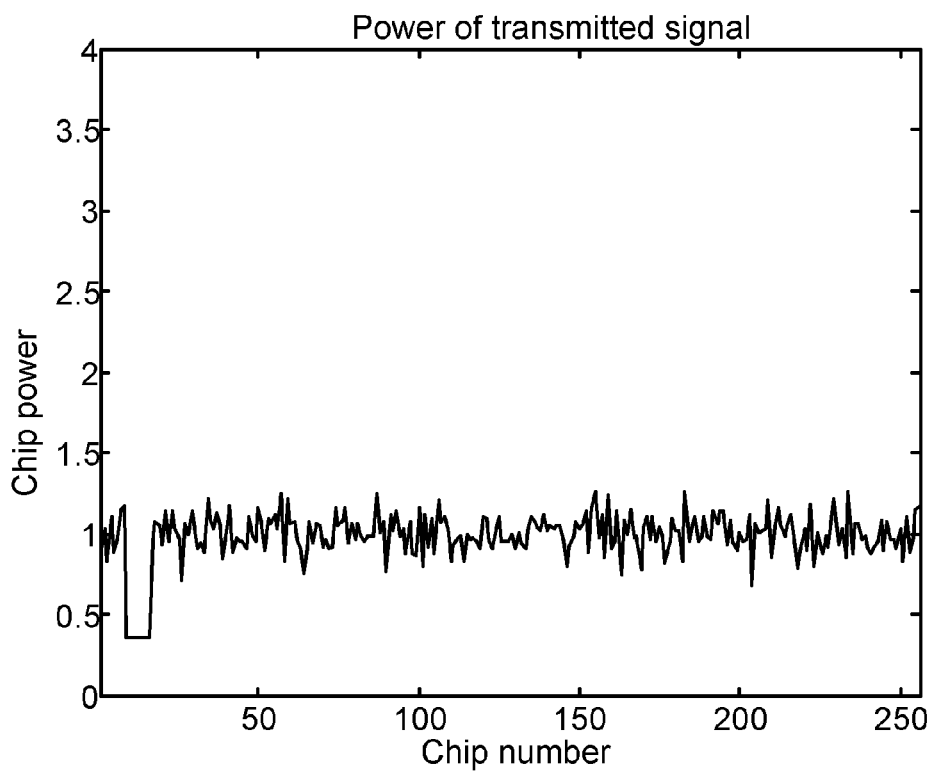
FIG. 15 is a graph of a simulation of a radio signal of an embodiment of a modified chip block of the present disclosure.
Figure 16:
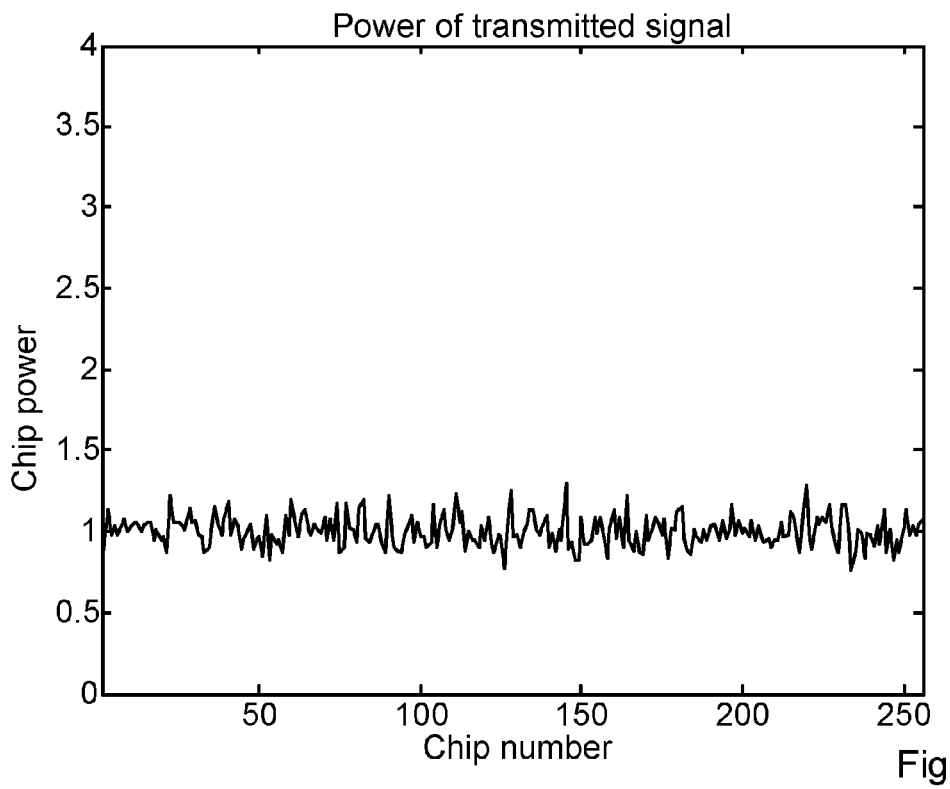
FIG. 16 is a graph of a simulation of a radio signal of another embodiment of a modified chip block of the present disclosure.
Figure 17:
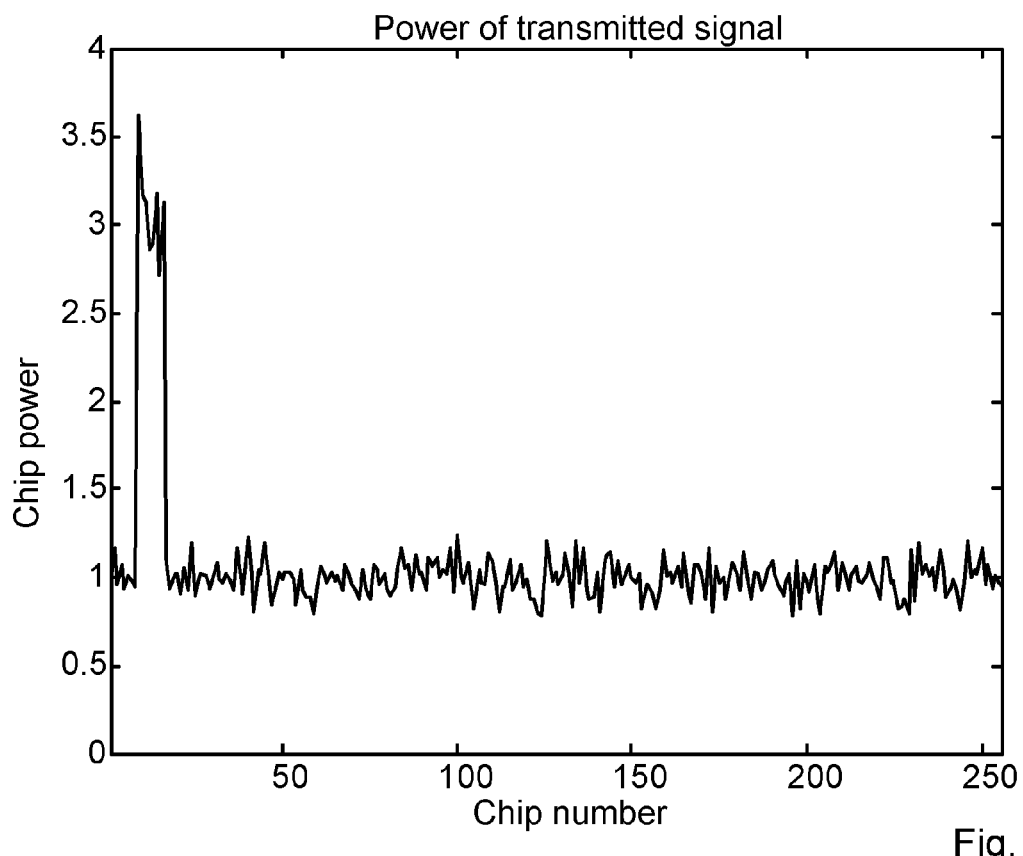
FIG. 17 is a graph of a simulation of a radio signal of another embodiment of a modified chip block of the present disclosure.

In FIGS. 15-18 some results from simulations of a modification algorithm (for creating a legacy transparent cyclic prefix) for blocks 17 of 256 chips 20 are shown. The average power is plotted for each chip in a 256 chip block 17. The cyclic prefix 18 is assumed to be eight chips 20 long, except in the last example (FIG. 18) where it is 19 chips to correspond to the LTE cyclic prefix length. In FIGS. 15-17, the number of SF16 codes used for legacy HSDPA HDR terminals 6 is increased from 0 (FIG. 15), through 2 (FIG. 16) to 7 (FIG. 17) and it is seen that the power of the modified part of the signal increases with number of legacy SF16 codes used. This motivates the use of some degrees of freedom, not for legacy SF16 data transmission, but for reduction of transmit power, to avoid the power consumption seen in FIG. 17 for the modified 105 chips 20. If too many degrees of freedom are used for this power reduction, as in FIG. 15 where no HSDPA data symbols of SF16 for legacy terminals are transmitted, the minimization of the average chip power will reduce the chip power of the modified signal maybe unnecessarily much. This motivates alternative objective functions, such as functions targeting unit chip power for all chips.

Figure 18:
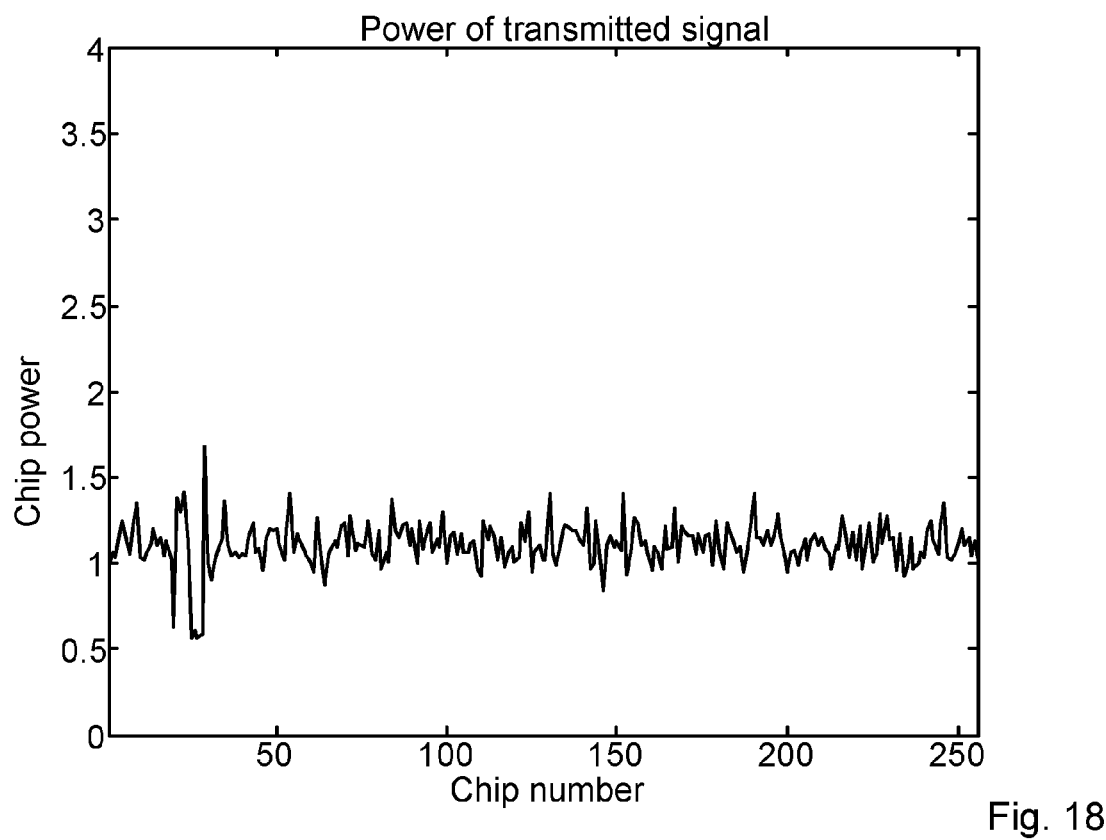
FIG. 18 is a graph of a simulation of a radio signal of another embodiment of a modified chip block of the present disclosure.

In FIG. 18 an example of a cyclic prefix 18 of length 19 chips 20 (same length in time as the cyclic prefix in LTE) is given. Note though, that since the cyclic prefix 18 is longer than sixteen chips 20, the whole first 16-chip sequence is modified, so no SF16 codes can be used for legacy HSDPA data transmission when the cyclic prefix is activated.

Below, some alternative or additional embodiments of the present disclosure are described.

In an embodiment, the present disclosure relates to a method of producing a chip block for wireless transmission in a Direct Sequence Code Division Multiple Access (DS-CDMA) communication system. The method comprises spreading a symbol 21 over at least one chip block 17. The method also comprises segmenting the chip block to form a first sub-block $a_0$ of the chip block. The method also comprises segmenting the chip block to form a second sub-block $a_{15}$ of the chip block. The method also comprises arranging a first sub-sequence 18 of chips furthest to a first end of the chip block in the first sub-block. The first sub-sequence is identical to a second sub-sequence 19 furthest to a second end of the chip block in the second sub-block. The method also comprises modifying at least one chip contained in the first sub-block and not being part of the first sub-sequence. The modifying is dependent on said first sub-sequence such that the symbol can be at least partially despread from the chip block.

In another embodiment, the present disclosure relates to a method of producing a chip block for wireless transmission in a Direct Sequence Code Division Multiple Access (DS-CDMA) communication system. The method comprises determining data bits to be transmitted over a radio interface. The method also comprises modulating the determined data bits to at least one symbol 21. The method also comprises spreading 101 said symbol over at least one chip block 17. The method also comprises segmenting 102 the chip block to form a first sub-block $a_0$ of the chip block, said first sub-block being arranged for containing a first number of chips 20. The method also comprises segmenting 103 the chip block to form a second sub-block $a_{15}$ of the chip block, said second sub-block being separate from said first sub-block and being arranged for containing a second number of chips 20. The method also comprises arranging 104 a first sub-sequence 18 of chips furthest to a first end of the chip block in the first sub-block. The first sub-sequence is identical to a second sub-sequence 19 furthest to a second end of the chip block in the second sub-block, whereby the sub sequences 18;19 form a cyclic prefix of the chip block 17. The method also comprises modifying 105 at least one chip 20 contained in the first sub-block and not being part of the first sub-sequence. The modifying is dependent on said first sub-sequence, such that an impact of the arranging 104 of the first sub-sequence on despreading of the symbol from the first sub-block is compensated for by the modifying 105 of said at least one chip. The method also comprises transmitting the chip block 17 over a radio interface 13.

In another embodiment, the present disclosure relates to a communication terminal 6 configured for producing a chip block 17 for wireless transmission in a Direct Sequence Code Division Multiple Access (DS-CDMA) communication system 16. The terminal comprises a processor 8 associated with a transmitter 10. The processor is configured for determining data bits to be transmitted over a radio interface. The processor is also configured for modulating the determined data bits to at least one symbol 21. The processor is also configured for spreading 101 said symbol over at least one chip block 17. The processor is also configured for segmenting 102 the chip block to form a first sub-block $a_0$ of the chip block, said first sub-block being arranged for containing a first number of chips 20. The processor is also configured for segmenting 103 the chip block to form a second sub-block $a_{15}$ of the chip block, said second sub-block being separate from said first sub-block and being arranged for containing a second number of chips 20. The processor is also configured for arranging 104 a first sub-sequence 18 of chips furthest to a first end of the chip block in the first sub-block. The first sub-sequence is identical to a second sub-sequence 19 furthest to a second end of the chip block in the second sub-block, whereby the sub sequences 18;19 form a cyclic prefix of the chip block 17. The processor is also configured for modifying 105 at least one chip 20 contained in the first sub-block and not being part of the first sub-sequence. The modifying is dependent on said first sub-sequence, such that an impact of the arranging 104 of the first sub-sequence on despreading of the symbol from the first sub-block is compensated for by the modifying 105 of said at least one chip.

In another embodiment, the present disclosure relates to a Radio Base Station (RBS) 1 configured for producing a chip block 17 for wireless transmission in a Direct Sequence Code Division Multiple Access (DS-CDMA) communication system 16. The RBS comprises a processor 3 associated with a transmitter 2. The processor is configured for determining data bits to be transmitted over a radio interface. The processor is also configured for modulating the determined data bits to at least one symbol 21. The processor is also configured for spreading 101 said symbol over at least one chip block 17. The processor is also configured for segmenting 102 the chip block to form a first sub-block $a_0$ of the chip block, said first sub-block being arranged for containing a first number of chips 20. The processor is also configured for segmenting 103 the chip block to form a second sub-block $a_{15}$ of the chip block, said second sub-block being separate from said first sub-block and being arranged for containing a second number of chips 20. The processor is also configured for arranging 104 a first sub-sequence 18 of chips furthest to a first end of the chip block in the first sub-block. The first sub-sequence is identical to a second sub-sequence 19 furthest to a second end of the chip block in the second sub-block, whereby the sub sequences 18;19 form a cyclic prefix of the chip block 17. The processor is also configured for modifying 105 at least one chip 20 contained in the first sub-block and not being part of the first sub-sequence. The modifying is dependent on said first sub-sequence, such that an impact of the arranging 104 of the first sub-sequence on despreading of the symbol from the first sub-block is compensated for by the modifying 105 of said at least one chip.

In another embodiment, the present disclosure relates to a method of producing a chip block 17 for wireless transmission in a Direct Sequence Code Division Multiple Access (DS-CDMA) communication system 16. The method comprises determining data bits to be transmitted over a radio interface. The method also comprises modulating the determined data bits to at least one symbol 21. The method also comprises segmenting 102 the chip block to form a first sub-block $a_0$ of the chip block, said first sub-block being arranged for containing a first number of chips 20. The method also comprises segmenting 103 the chip block to form a second sub-block $a_{15}$ of the chip block, said second sub-block being separate from said first sub-block and being arranged for containing a second number of chips 20. The method also comprises arranging 104 a first sub-sequence 18 of chips furthest to a first end of the chip block in the first sub-block. The first sub-sequence is identical to a second sub-sequence 19 furthest to a second end of the chip block in the second sub-block, whereby the sub sequences 18;19 form a cyclic prefix of the chip block 17. The method also comprises modifying 105 at least one chip 20 contained in the first sub-block and not being part of the first sub-sequence, by modifying 401 the symbol 21. The modifying is dependent on said first sub-sequence, such that an impact of the arranging 104 of the first sub-sequence on despreading of the symbol (as non-modified) from the first sub-block is compensated for by the modifying 105 of said at least one chip. The method also comprises spreading 101 the symbol 21, as modified 401, over at least the chip block 17. The method also comprises transmitting the chip block 17 over a radio interface 13.

In another embodiment, the present disclosure relates to a communication terminal 6 configured for producing a chip block 17 for wireless transmission in a Direct Sequence Code Division Multiple Access (DS-CDMA) communication system 16. The terminal comprises a processor 8 associated with a transmitter 10. The processor is configured for determining data bits to be transmitted over a radio interface. The processor is also configured for modulating the determined data bits to at least one symbol 21. The method also comprises segmenting 102 the chip block to form a first sub-block $a_0$ of the chip block, said first sub-block being arranged for containing a first number of chips 20. The processor is also configured for segmenting 103 the chip block to form a second sub-block $a_{15}$ of the chip block, said second sub-block being separate from said first sub-block and being arranged for containing a second number of chips 20. The processor is also configured for arranging 104 a first sub-sequence 18 of chips furthest to a first end of the chip block in the first sub-block. The first sub-sequence is identical to a second sub-sequence 19 furthest to a second end of the chip block in the second sub-block, whereby the sub sequences 18;19 form a cyclic prefix of the chip block 17. The processor is also configured for modifying 105 at least one chip 20 contained in the first sub-block and not being part of the first sub-sequence, by modifying 401 the symbol 21. The modifying is dependent on said first sub-sequence, such that an impact of the arranging 104 of the first sub-sequence on despreading of the symbol from the first sub-block is compensated for by the modifying 105 of said at least one chip. The processor is also configured for spreading 101 the symbol 21, as modified 401, over at least the chip block 17.

In another embodiment, the present disclosure relates to a Radio Base Station (RBS) 1 configured for producing a chip block 17 for wireless transmission in a Direct Sequence Code Division Multiple Access (DS-CDMA) communication system 16. The RBS comprises a processor 3 associated with a transmitter 2. The processor is configured for determining data bits to be transmitted over a radio interface. The processor is also configured for modulating the determined data bits to at least one symbol 21. The method also comprises segmenting 102 the chip block to form a first sub-block $a_0$ of the chip block, said first sub-block being arranged for containing a first number of chips 20. The processor is also configured for segmenting 103 the chip block to form a second sub-block $a_{15}$ of the chip block, said second sub-block being separate from said first sub-block and being arranged for containing a second number of chips 20. The processor is also configured for arranging 104 a first sub-sequence 18 of chips furthest to a first end of the chip block in the first sub-block. The first sub-sequence is identical to a second sub-sequence 19 furthest to a second end of the chip block in the second sub-block, whereby the sub sequences 18;19 form a cyclic prefix of the chip block 17. The processor is also configured for modifying 105 at least one chip 20 contained in the first sub-block and not being part of the first sub-sequence, by modifying 401 the symbol 21. The modifying is dependent on said first sub-sequence, such that an impact of the arranging 104 of the first sub-sequence on despreading of the symbol from the first sub-block is compensated for by the modifying 105 of said at least one chip. The processor is also configured for spreading 101 the symbol 21, as modified 401, over at least the chip block 17.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of producing a chip block for wireless transmission in a Direct Sequence Code Division Multiple Access, DS-CDMA communication system, the method comprising:
producing, by a processor associated with a communication terminal, the chip block by:
spreading a symbol over at least one chip block,
segmenting the chip block to form a first sub-block of the chip block, said first sub-block being arranged for containing a first number of chips,
segmenting the chip block to form a second sub-block of the chip block, said second sub-block being separate from said first sub-block and being arranged for containing a second number of chips,
arranging a first sub-sequence of chips furthest to a first end of the chip block in the first sub-block ($a_0;a_{15}$), which first sub-sequence is identical to a second sub-sequence furthest to a second end of the chip block in the second sub-block, whereby the sub sequences form a cyclic prefix of the chip block,
modifying at least one chip contained in the first sub-block and not being part of the first sub-sequence, the modifying being dependent on said first sub-sequence such that the symbol can be at least partially despread from the chip block, and
transmitting, by a transmitter associated with the communication terminal, the produced chip block over a radio interface of the communication system.

2. The method of claim 1, wherein the arranging comprises: copying the second sub-sequence of chips to the first sub-block.

3. The method of claim 1, wherein the first sub-block contains chips which are arranged to be transmitted first among the chips of the chip block, and the second sub-block contains chips which are arranged to be transmitted last among the chips of said chip block.

4. The method of claim 1, wherein the symbol can be fully obtained from the first sub-block if despread.

5. The method of claim 1, wherein the modifying comprises:
modifying each of the chips of the first sub-block which is not part of the first sub-sequence.

6. The method of claim 1, wherein the modifying comprises:
generating at least one modification symbol; and
spreading the modification symbol over the first sub-block.

7. A computer program for producing a chip block for wireless transmission in a Direct Sequence Code Division Multiple Access, DS-CDMA communication system, the computer program comprising computer program code which, when run on a processor associated with a radio transmitter, causes the processor to:
spread a symbol over at least one chip block;
segment the chip block to form a first sub-block of the chip block, said first sub-block being arranged for containing a first number of chips;
segment the chip block to form a second sub-block of the chip block, said second sub-block being separate from said first sub-block and being arranged for containing a second number of chips;
arrange a first sub-sequence of chips furthest to a first end of the chip block in the first sub-block, which first sub-sequence is identical to a second sub-sequence furthest to a second end of the chip block in the second sub-block; and
modify at least one chip contained in the first sub-block and not being part of the first sub-sequence, the modifying being dependent on said first sub-sequence such that the symbol can be at least partially despread from the chip block.

8. The computer program according to claim 7, wherein the computer program code which, when run on the processor, causes the processor to copy the second sub-sequence of chips to the first block.

9. The computer program according to claim 7, wherein the first sub-block contains chips which are arranged to be transmitted first among the chips of the chip block, and the second sub-block contains chips which are arranged to be transmitted last among the chips of said chip block.

10. The computer program according to claim 7, wherein the symbol can be fully obtained from the first sub-block if despread.

11. The computer program according to claim 7, wherein the computer program code which, when run on the processor, causes the processor to modify each of the chips of the first sub-block which is not part of the first sub-sequence.

12. The computer program according to claim 7, wherein the computer program code which, when run on the processor, causes the processor to generate at least one modification symbol and spread the modification symbol over the first sub-block.

* * * * *